United States Patent [19]

McCandless

[11] Patent Number: 5,626,294

[45] Date of Patent: May 6, 1997

[54] DIMETHYL ETHER POWERED ENGINE

[75] Inventor: James C. McCandless, Grosse Pointe Park, Mich.

[73] Assignee: Navistar International Transportation Corp., Chicago, Ill.

[21] Appl. No.: 563,800

[22] Filed: Nov. 28, 1995

Related U.S. Application Data

[62] Division of Ser. No. 393,103, Feb. 22, 1995, Pat. No. 5,485,818.

[51] Int. Cl.$^6$ .................................................. F02M 39/00
[52] U.S. Cl. .................................. 239/533.3; 239/533.9; 239/601
[58] Field of Search .......................... 239/533.2, 533.3, 239/533.5, 533.9, 585.1, 585.5, 601

[56] References Cited

U.S. PATENT DOCUMENTS

| | | | |
|---|---|---|---|
| 3,802,626 | 4/1974 | Regneault et al. | 239/533.5 |
| 4,187,987 | 2/1980 | Raue | 239/585.1 |
| 4,349,152 | 9/1982 | Akagi | 239/533.2 |
| 4,448,356 | 5/1984 | Nakajima et al. | 239/533.9 |
| 4,535,939 | 8/1985 | Skinner | 239/533.3 |
| 4,575,008 | 3/1986 | Kaczynski | 239/533.3 |
| 4,635,854 | 1/1987 | Ishibashi | 239/533.9 |
| 4,669,668 | 6/1987 | Ogawa | 239/533.9 |
| 4,747,545 | 5/1988 | Trachte et al. | 239/533.9 |
| 4,848,668 | 7/1989 | Andrews et al. | 239/533.5 |
| 4,852,808 | 8/1989 | Yamamoto | 239/533.3 |
| 4,889,288 | 12/1989 | Gaskell | 239/533.5 |
| 4,909,440 | 3/1990 | Mitsuyasu | 239/533.9 X |
| 4,911,366 | 3/1990 | Priesner | 239/533.3 |
| 4,946,106 | 8/1990 | Turchi et al. | 239/533.3 |
| 5,012,786 | 5/1991 | Voss | 239/533.9 X |
| 5,165,607 | 11/1992 | Stevens | 239/533.9 |
| 5,167,370 | 12/1992 | Henkel | 239/533.3 X |
| 5,205,492 | 4/1993 | Khinchuk | 239/533.4 |
| 5,265,804 | 11/1993 | Brunel | 239/585.1 |

*Primary Examiner*—Andres Kashnikow
*Assistant Examiner*—Lisa Ann Douglas
*Attorney, Agent, or Firm*—Dennis K. Sullivan

[57] ABSTRACT

An internal combustion engine that is driven by dimethyl ether (DME) and a storage and delivery system for the DME that will reduce considerably the emissions of $NO_x$ and particulate. Existing internal combustion engines, fueled by conventional fuels can be economically converted to the use of DME as a fuel.

2 Claims, 4 Drawing Sheets

DIMETHYL ETHER POWERED ENGINE

This is a division of application Ser. No. 08/393,103, filed Feb. 22, 1995, now U.S. Pat. No. 5,485,818.

BACKGROUND OF THE INVENTION

Air pollution is a serious problem especially in large cities. In the U.S. the Environmental Protection Agency has the primary responsibility for carrying out the requirements of the Clean Air Act, which specifies that air-quality standards shall be established for hazardous substances. There are also state laws and international Protocols that set standards.

Some air pollutants are formed through the action of sunlight on previously emitted reactive materials (called precursors). For example, ozone, a pollutant in smog, is produced by tile interaction of hydrocarbons and nitrogen oxides under the influence of sunlight. Although many types of combustion contribute to this problem, trucks and buses have been identified as a significant source of both oxides of nitrogen ($NO_x$) and particulate matter (PM). Pollution from internal combustion engines has been significantly reduced by burning the fuel as completely as possible, by recirculating fumes and by using catalytic converters. However, standards are constantly being changed in an attempt to lower exhaust emissions. Current standards propose $NO_x$ emissions limits of between 1.5 and 2 grams per brake horse power per hour (g/bhp-hr). The state of California has adopted an Ultra Low Emission Vehicle (hereinafter ULEV) regulation, which will become effective in 1998, for medium-duty vehicles that limits $NO_x$ plus hydrocarbons at 2.5 g/bhp-hr and caps particulates at 0.05 g/bhp-hr. In addition this California regulation restricts the emissions of formaldehyde (HCHO) to 0.025 g/bhp-hr and Carbon Monoxide (CO) emissions to 7.2 g/bhp-hr. Meeting such standards will be difficult for spark ignited (SI) engines and even more difficult.

Trying to meet such standards alternative fuels such as Methanol and Ethanol have been tried. Dimethyl ether, $CH_3$—O—$CH_3$ hereinafter DME, is currently used as a propellant for spray cans. DME was adopted for this use as a replacement for chlorofluorcarbons. DME has been used in experiments, as an ignition enhancer, for Methanol-fueled Diesel Engines. However, even when the ratio of DME to Diesel Fuel is as high as 60%, satisfactory operation was not obtained. Recently, a limited test was conducted using pure DME as an alternative fuel in a single cylinder, four stroke, direct injection Diesel Engine. This test yielded very promising combustion, performance and emissions results. Although the fuel injection system used in this test was designed for standard diesel fuel, when using DME the thermal efficiency of the engine was equivalent to when diesel fuel is used. Furthermore, as compared to standard diesel fuel the $NO_x$, were low and the smoke emissions were extremely low. Reference is made to a soon to be published paper by S.C. Sorenson entitled, Performance and Emissions of a 0.273 Liter Direct Injection Diesel Engine with a New Alternative Fuel, in which this test are discussed.

The use of DME as an alternative fuel does have obstacles that must be overcome. DME is a gas at ambient temperature and pressure and thus the fuel storage and delivery system must be pressurized to maintain the DME in a liquid state. DME must be pressurized to about five bar to keep it in a liquid state under ambient conditions. At the elevated temperatures present on an internal combustion engine higher pressures (12–30 bar) are required to maintain DME in a liquid state.

The energy density of DME, although higher than the alternative fuels Methanol ($CH_3OH$) and Ethanol ($CH_3$—$CH_2$—OH) it is much lower than conventional Diesel Fuel. As a result to obtain the same power from an engine fueled by DME obtained when fueling with Diesel Fuel the volume of DME must be increased by a factor of about 1.8. To accommodate this increased volume the fuel injector must have a larger orifice opening. A single hole pintle type nozzle, rather than a multi hole nozzle, has been found to function well to provide this increased fuel flow.

A fuel's Cetane number, which is a measure of the fuel's ability to auto-ignite, has an important influence on diesel combustion and is a meaningful indicator of a fuel's value for diesel engines. Fuels with a high Cetane number will ignite quicker and thus will have a short ignition delay. This lowers premixed burning of the fuel, which in turn lowers $NO_x$ and noise emissions. DME has a higher Cetane number than Diesel Fuel and thus it will ignite quicker and will have a relatively short ignition delay. By throttling the amount of fuel injected during the initial portion of the injection cycle the quantity of fuel in the combustion chamber when ignition occurs has been diminished which significantly lowers $NO_x$ and noise emissions. The mechanism for throttling the fuel injected during the initial portion of the injection cycle should be time dependent such that it can be coordinated with ignition delay that is also time dependent.

Also the vapor pressure of DME is higher than most other fuels. At 38° Centigrade, the vapor pressure of DME is 8 bar as compared to 0.0069 bar and 0.35 bar respectively for Diesel fuel and Methanol. Thus DME will boil at a lower atmosphere pressure than Diesel fuel or Methanol. The system must be pressurized to prevent the fuel from flashing to vapor in the engine's fuel manifolds or fuel injection system.

The viscosity of DME is estimated to be about 5% to 10% of diesel fuel. This relatively low viscosity of DME portends fuel leakage in a system designed for fuels higher viscosities. Thus, standard fuel storage and delivery systems will not be suitable for DME.

Test results, such as those described in the above referred to Sorenson paper, are obtained in carefully controlled and monitored operating environments and conditions. It is often difficult to duplicate such test results outside the laboratory. As a result further developments are required to obtain the same results in a production situation where many and changing conditions are experienced.

Internal combustion engines and especially Diesel engines represent large capital investments and have long useful lives. The current process for producing DME would result in a price that would render it unacceptable as an alternative fuel. A new less costly manufacturing method has been developed to produce "raw DME" which is a form of DME that includes small amounts of water and Methanol. Large capital investments would be required to build the necessary facilities to produce raw DME at volumes that would meet its demand as an alternative fuel. Even greater capital investments would be required to provide the necessary refueling system. Large capital investments of this magnitude are unlikely to be made if the alternative fuel can only be used in newly produced special designed engines. Thus, a very important consideration for an alternative fuel is whether economic field conversions can be made to existing engines to enable them to use the alternative fuel.

For these reasons, there is a need for a fuel storage and delivery system that will enable internal combustion engines to be powered with DME fuel in a broad range of environmental conditions. The new and improved fuel storage and delivery system must also permit existing internal combustion engines to be economically converted in the field to be fueled by DME.

SUMMARY OF THE INVENTION

The present invention is directed to the use of DME as a fuel in internal combustion engines and a DME storage and delivery system for internal combustion engines. Experimental work done by Sorenson yielded test results that suggest that the use of DME as an alternative fuel for internal combustion engines may enable the current ULEV standards to be met or even exceeded. This invention will enable the test results seen in the laboratory work described in the Sorenson paper to be achieved in production internal combustion engines that operate in many conditions and in environments that are constantly changing. The present invention will also enable existing engines fueled by conventional fuel to be economically converted to use DME as a fuel.

The present invention is directed to a fuel storage and delivery system including a fuel pump that has low internal leakage to accommodate the low viscosity of the DME.

The injector of this invention utilizes a pintle type nozzle that can provide the increased volume of DME fuel required in the same cylinder rotation arc required in an engine using diesel fuel.

This invention uses a characteristic of the pintle nozzle, to gradually increase its orifice area as the nozzle is lifted, to damp the fuel flow during the initial portion of the injection cycle. This improved injector, with damping, can be used with engines using diesel fuels and also engines that are powered by DME.

The injection system of this invention controls the rate at which the DME is injected and thus reduces the premixed fuel quantity and avoids noisy combustion and high $NO_x$ emissions.

The nozzle orifice area of this invention is relatively large to accommodate for the lower density and heating value of DME.

This invention provides flexible injection timing to optimize the tuning of the engine and gain low emissions.

For the foregoing reasons there is a need for a DME storage and delivery system for internal combustion engines that will enable the favorable emission properties of DME to be exploited in new and existing engines.

DETAILED DESCRIPTION OF THE PREFERRED EMBODIMENT

Figure 1:
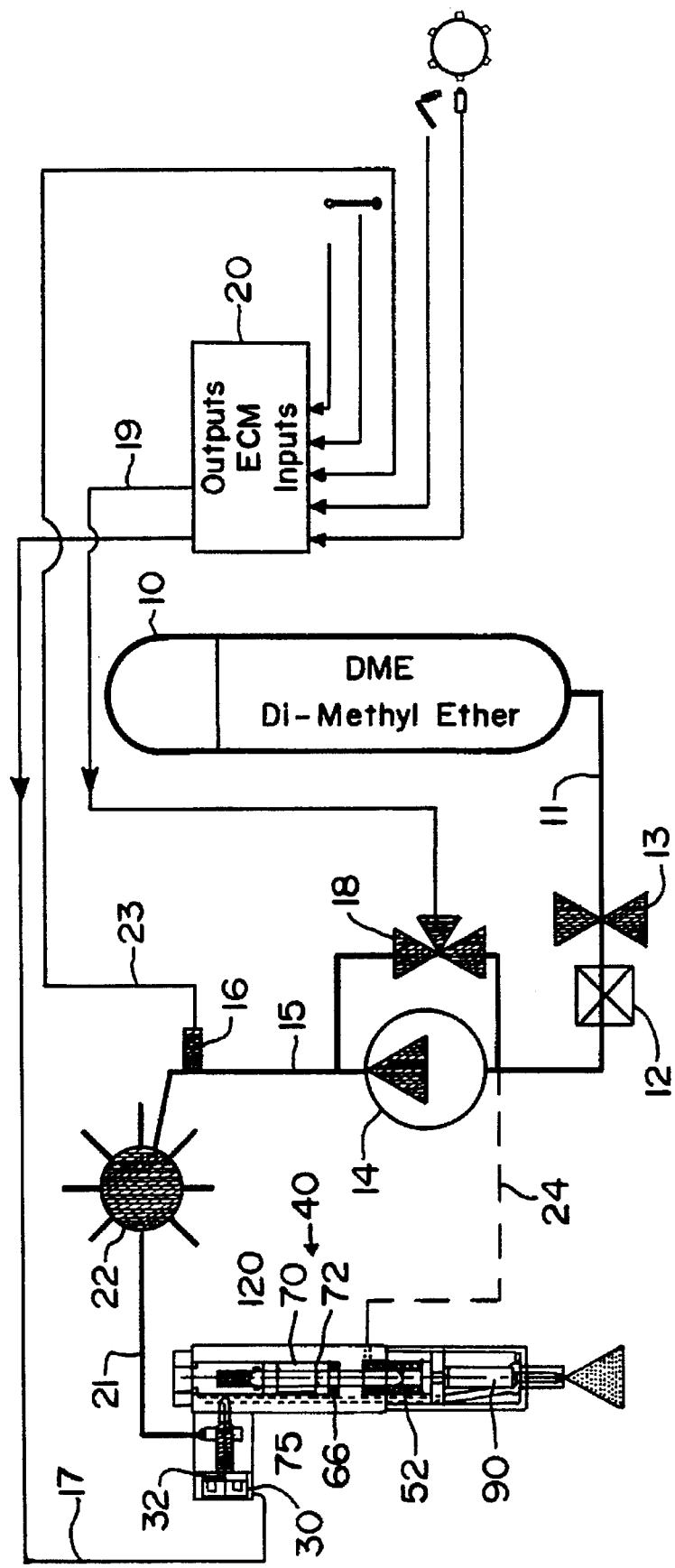
FIG. 1 is a schematic view of an embodiment of the invention in which a common rail injection system is provided for the DME.

There is shown in FIG. 1 a schematic view of an embodiment of the invention in which the fuel for an internal combustion engine is stored in a pressurized fuel tank 10 from which it is fed by a pump 14 to a rail 22 which functions as an accumulator system from which fuel is distributed to unit injectors 40. DME must be pressurized to about 5 bar to keep it in a liquid state under ambient conditions. At the elevated temperatures present on an internal combustion engine the fuel tank 10 should be pressurized to about 9 bar to insure that the DME is maintained in a liquid state.

The fuel pump 14 must be able to provide DME to the rail 22 at a pressure in the range of 100–300 bar. The fuel supply pump 14 can be driven by the engine, at a speed ratio of engine speed to pump speed in the range of 1:1 to 1:0.5. Pump 14 must have the capacity to meet the engine's peak torque requirements. At peak torque an engine is rotating at a relatively high rate, and accordingly drives the fuel pump at a relatively high rate. At this relatively high speed a gear type pump would have high efficiency even when pumping DME which has a very low viscosity. The viscosity of DME is about 10% of the viscosity of Diesel fuel. Thus, a gear type pump would perform adequately when the engine is operating at peak torque speeds. However, another critical requirement for the fuel pump 14, is that it must be able to supply sufficient fuel to the engine during start-up. At start-up the engine and therefore the pump 14 will be running at a relatively low speed. A diesel engine that delivers peak torque at speeds of 2,000 rpm will have a start-up speed of about 200 rpm. At 200 rpm the efficiency of a gear type pump will be very low and inadequate to start the engine when pumping a fluid having a viscosity as low as that of DME. The low speed combined with the low viscosity of DME fuel affords time for the fuel to leak internally around the gears of the pump. This internal leakage is an inefficiency in the pump and if it is too high the pump can't manage the critical engine start-up requirements. As the engine speed and the corresponding pump speed increases there is less time for internal leakage and consequently there is less leakage. For these reasons a highly efficient pump is necessary when using DME as a fuel. A piston type pump with seals to minimize leakage, that has an efficiency of about 50% at starting speed when pumping DME has been found suitable.

A filter 12 and a shut-off valve 13 are provided in the line 11 that extends from the fuel tank 10 to the pump 14. The Rail Pressure Modulator Valve (RPMV) 18 functions to control the output pressure of the pump 14 that determines the pressure of the DME in the common rail 22. The RPMV also functions as a relief valve to prevent DME, at excess pressures, from being sent to the rail 22. A pressure transducer 16 is provided in the line 15 that extends from the pump 14 to the rail 22. As will be discussed in more detail, transducer 16 can be used to monitor the rail pressure and transmit data back to the ECM through a line 23.

A common rail 22, which dispenses fuel to all of the engine's cylinders, is necessary to ensure a constant fuel pressure to all injector's. In FIG. 1 the rail 22 has been illustrated to have eight fuel passages 21. It should be understood that if the rail 22 is being used on a four or six cylinder engine the rail would have one passage 21 for each cylinder. Although the rail 22 is shown as a separate component it could be an integral part of the engine.

Figure 2:
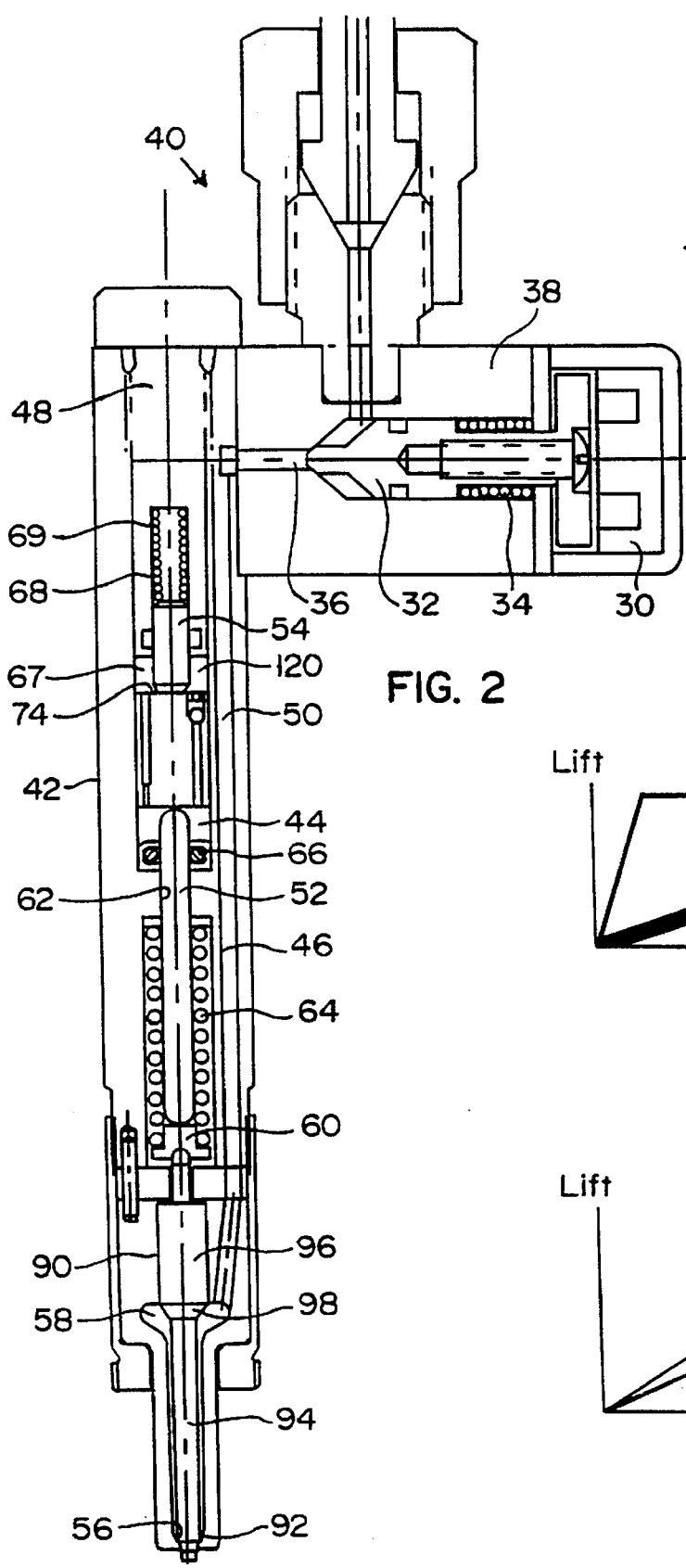
FIG. 2 is a detailed, partially cut away, view of an embodiment of a unit injector.

One unit injector 40 has been illustrated in FIG. 1, however it should be understood that there is a unit injector 40 for each of the engine's combustion cylinders. The body of the injector 40 has an upper bore 44 that extends longitudinally from its upper end as seen in FIG. 2. The upper bore 44 is closed by a plug 48 at its upper end. A damping piston 70 is contained in the chamber 67 defined by the upper bore 44 and the plug 48. There is silicone fluid 120 or other suitable viscous fluid in the chamber 67. The fuel passage 21 from the rail 22 is secured to a side extension 38 of the injector 40 such that the DME fuel enters the injector through an inlet passage 36. An injector solenoid 30 is carried by the extension 38, which when energized opens a valve 32 that is normally held closed by a spring 34 or by a magnetic force. When the valve 32 is opened by the solenoid 30, the DME fuel flows through the inlet passage 36 into the fuel passage 50 that extends longitudinally through the body of the injector 40. Injector 40 carries a pintle nozzle 90 at its bottom end, as seen in FIG. 1. An optional fuel return vent line 24 can be provided.

The Electronic Control Module (ECM) 20 includes a microprocessor that receives inputs from various engine monitors such as fuel temperature, fuel rail pressure, throttle position, engine revolutions per minute and cam angle. The ECM 20 is programmed with the operating strategy of the system and controls the operation of the entire fuel system. Other engine conditions that can be monitored and input to the ECM are, for example, oil temperature, ambient air temperature, barometric pressure and exhaust back pressure. The pressure transducer 16 in line 15 is an example of one such monitor.

The ECM 20 computes output control signals 19 and 17. The outputs signals 17 are sent to the solenoids 30 and cause the solenoids to be actuated at a precise time. Output control signal 17 determines the time for starting fuel injection and the duration of each injection.

The output signal 19 represents the desired rail pressures for the specific engine conditions calculated according to the operating strategy of the system and in response to the data collected by the various monitors. Signal 19 is directed to a Rail Pressure Modulator Valve (RPMV) 18. The RPMV 18 functions to control the output pressure of the pump 14 that determines the pressure of the DME in the common rail 22.

Referring now to FIGS. 2 through 9 the injector 40 will be discussed in more detail.

The injector 40 includes a generally cylindrical shaped body portion 42. The injector 40 disclosed herein conforms to the shape and dimensions of a standard 17 millimeter injector that is currently used in diesel engines available from most engine sources. Thus existing conventional diesel engines can receive injector 40 by simply replacing the conventional injectors. The other modifications necessary to convert a conventional diesel engine from diesel fuel to DME are relatively minor and it will be possible to convert existing diesel engines to DME fuel.

Figure 6:
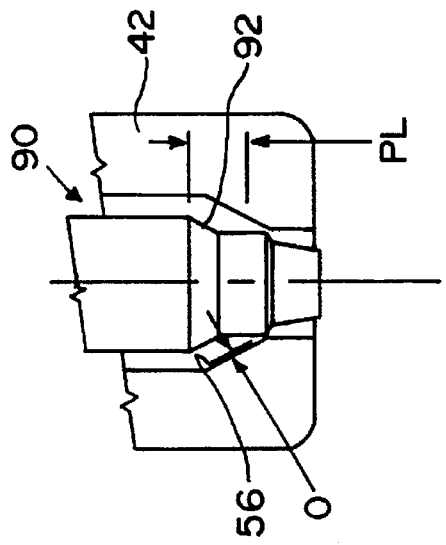
FIG. 6 is a detailed view of an embodiment of a pintle nozzle in the closed position.
Figure 7:
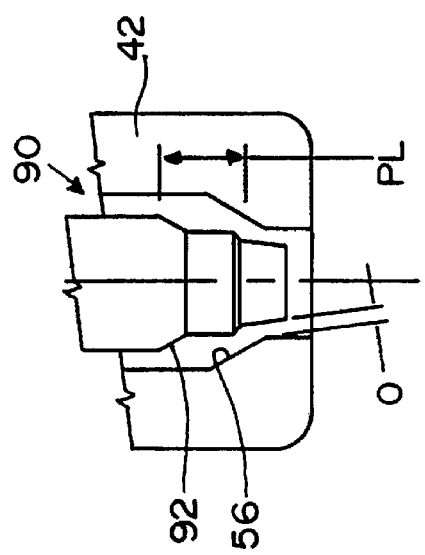
FIG. 7 is a detailed view of the pintle nozzle of FIG. 6 in a slightly raised or open position.
Figure 8:
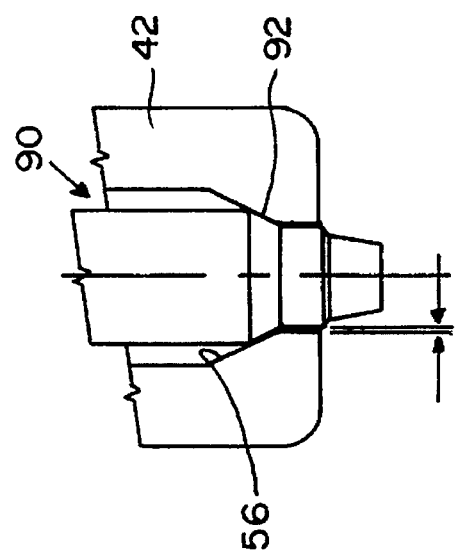
FIG. 8 is a detailed view of the pintle nozzle of FIG. 6 in a greater raised or open position then shown in FIG. 7.
Figure 9:
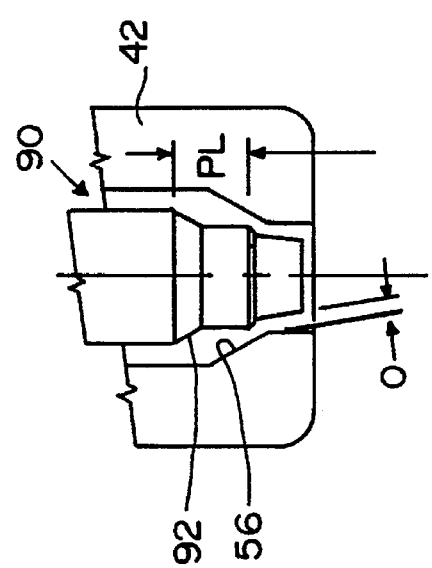
FIG. 9 is a detailed view of the pintle nozzle of FIG. 6 in a fully raised or open position.

The injector 40 has been provided with a pintle type nozzle 90, at its bottom or first end, rather than a multi hole nozzle. The single hole design feature of a pintle nozzle functions well to provide the increased fuel flow necessary when using DME. Pintle type nozzles have the characteristic of increasing the flow area as the pintle is lifted. This feature is best illustrated in FIGS. 6 through 9. In FIG. 6 a first beveled portion 92 of the pintle nozzle 90, located at the discharge end of the pintle nozzle, is seated on a corresponding beveled portion 56 of the body 42 and the flow area is zero and accordingly there is no flow. It should be noted that there is a slight clearance between the corresponding cylindrical portions of the pintle and body below the first beveled portion 92 and the beveled portion 56. In FIG. 7 the pintle 90 has been lifted slightly, indicated by the letters PL, and the orifice, indicated by the letter O, has opened slightly. In FIG. 8 the pintle 90 has been further lifted and the flow area of the orifice has increased. In FIG. 9 the pintle 90 is fully lifted and the flow area of the orifice is at its maximum.

Referring now to FIG. 2, lifting of the pintle nozzle 90 will be described. The pressurized DME fuel enters the injector 40, at the top or second end of the injector body 42, through the inlet passage 36 when the injector solenoid 30 is energized and flows longitudinally through a fuel passage 50 formed in the injector body 42. Fuel passage 50 opens into a cavity 58. The pintle nozzle 90 includes first and second piston like portions 94 and 96 respectively that slide in corresponding cylindrical bores in the injector body 42 to thus guide and allow the pintle nozzle 90 to reciprocate longitudinally in the injector body 42. First piston like portion 94 is of a smaller diameter than second piston like portion 96 and these piston like portions are connected by a second beveled portion 98. The second beveled portion 98 of the pintle nozzle is located in the cavity 58 and when the pressurized DME fuel enters cavity 58 it exerts a force on the second beveled portion 98, a component of which is directed upward. This upward directed force lifts the pintle nozzle. The upper end of the pintle nozzle extends into a lower bore 46 formed in the injector body 42 where it bears against a spring seat 60 biased downwardly by a spring 64. The upper end of spring 64 engages the top surface of the lower bore 46. The upper portion of the spring seat 60 is in contact with the lower end of a lower push rod 52 that slides in a cylindrical opening 62 that connects the upper bore 44 with the lower bore 46. The upper end of lower push rod 52 extended through a seal 66, secured to the bottom surface of the upper bore 44, and bears against the bottom surface of the damping piston 70. The volume of the upper bore 44 that is not occupied by the damping piston 70 is filled with silicone fluid 120 or other suitable viscous fluid. An upper push rod 54 bears against the circular top surface 74 of the damping piston 70 and extends into a bore 68 formed in the plug 48. The upper end of upper push rod 54 engages a spring 69 contained in the bore 68. Spring 69 exerts, through the upper push rod 54, a downward force on the damping piston 70.

Figure 3:
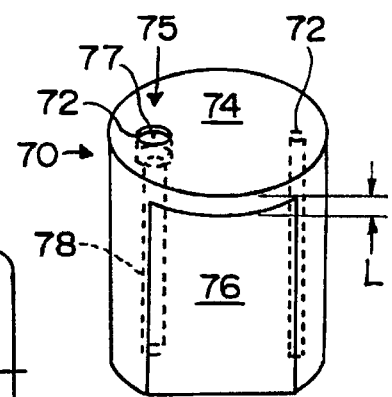
FIG. 3 is a perspective view of the damping piston of FIG. 2.

An isolated perspective view of the damping piston 70 is shown in FIG. 3. The damping piston 70 has a generally cylindrical shape and includes a flat circular top surface 74. A pair of rectangular shaped flat surfaces 76 are formed on opposite sides of the damping piston 70. The flat surfaces 76 do not; extend to the top circular surface 74 and there remains part of the damping piston at its upper end that is a complete cylinder. The damping piston 70 and upper bore 44 are dimensioned to allow the damping piston 70 to reciprocate with a close sliding relationship in the upper bore 44. The longitudinal length of the true cylinder portion is represented by L in FIG. 3. As shall be discussed in more detail the duration of the throttling of the fuel injection during the initial portion of the injection can be controlled or changed by utilizing damping pistons 70 in which the dimension L is different.

A damping orifice 72, is formed by a bore having a relatively small diameter that extends from the top surface 74 to the bottom surface of the damping piston 70.

A reverse flow check valve 75 is provided in the damping piston 70 by a bore 78 having a larger diameter than the diameter of the damping orifice 72. At the top surface 74 the flow check valve bore 78 is enlarged to form a check ball cage. When the damping piston 70 is being forced upward through the silicone fluid the check ball 77 seats and closes the bore 78 and thus prevents silicone fluid from passing through the bore 78. However, when the damping piston 70 moves downward the silicone fluid can pass upward through the bore 78 raising the check ball 77 off its seat. The check ball 77 is retained in the enlarged portion of bore 78 by the check ball cage but permits free passage of the silicone fluid. When the damping piston 70 moves downwardly, the silicone fluid 120 is also free to pass unencumbered through the damping orifice 72.

When the damping piston 70 is forced into the silicone fluid, above the damping piston, the silicone fluid is forced to flow through the damping orifice 72. Thus upward movement of the damping piston 70 and the pintle nozzle is slowed or restricted. As the damping piston 70 raises in upper bore 44 a distance equal to the dimension L, the flats 76 become uncovered which opens a path for the silicone fluid to flow from above the damping piston 70 to below the damping piston 70. This ends damping and the velocity of the damping piston 70 and the pintle nozzle increases. The pintle nozzle lift L at which the flats 76 are exposed can be varied by using a damping piston 70 having a different dimension L.

Figure 4:
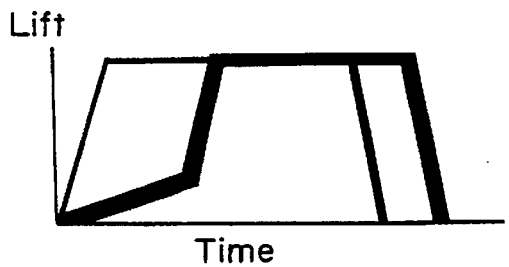
FIG. 4 is a lift/time diagram illustrating the nozzle needle lift with and without the damper.

FIG. 4. is a graph plotting pintle nozzle lift on the Y axis and time on the X axis. The thin line on the graph represents the lift over time for a pintle nozzle that is not damped and the heavy line represents the lift over time for a pintle nozzle that is damped. The lift of the pintle nozzle with damping is gradual to the point where the flats 76 are exposed at which point the lift is accelerated until maximum lift is achieved.

Figure 5:
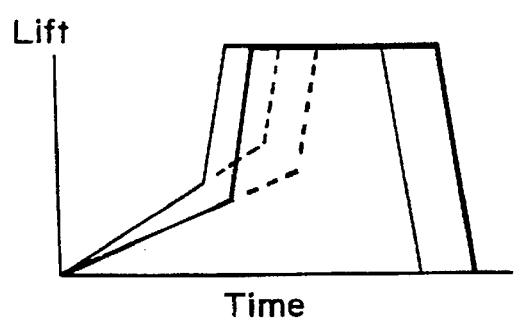
FIG. 5 is a lift/time diagram illustrating the effect of high and low viscosity fluid.

The velocity of the pintle nozzle lift can be adjusted by using silicone fluids having different fluid viscosities. FIG. 5 is a graph in which pintle nozzle lift is shown on the Y axis and time on the X axis. In this graph the thin line represents a low viscosity silicone fluid and the heavy line represents a high viscosity silicone fluid. This graph illustrates that as the viscosity of the silicone fluid is increased the throttling or damping effect on the lift increases. This graph also illustrates, through the broken lines, how the combination of using silicone fluids of different viscosity and changing the length of dimension L effects the lift of pintle nozzle. Thus, the lift of the pintle nozzle can be customized for a particular engine or environment.

Figure 10:
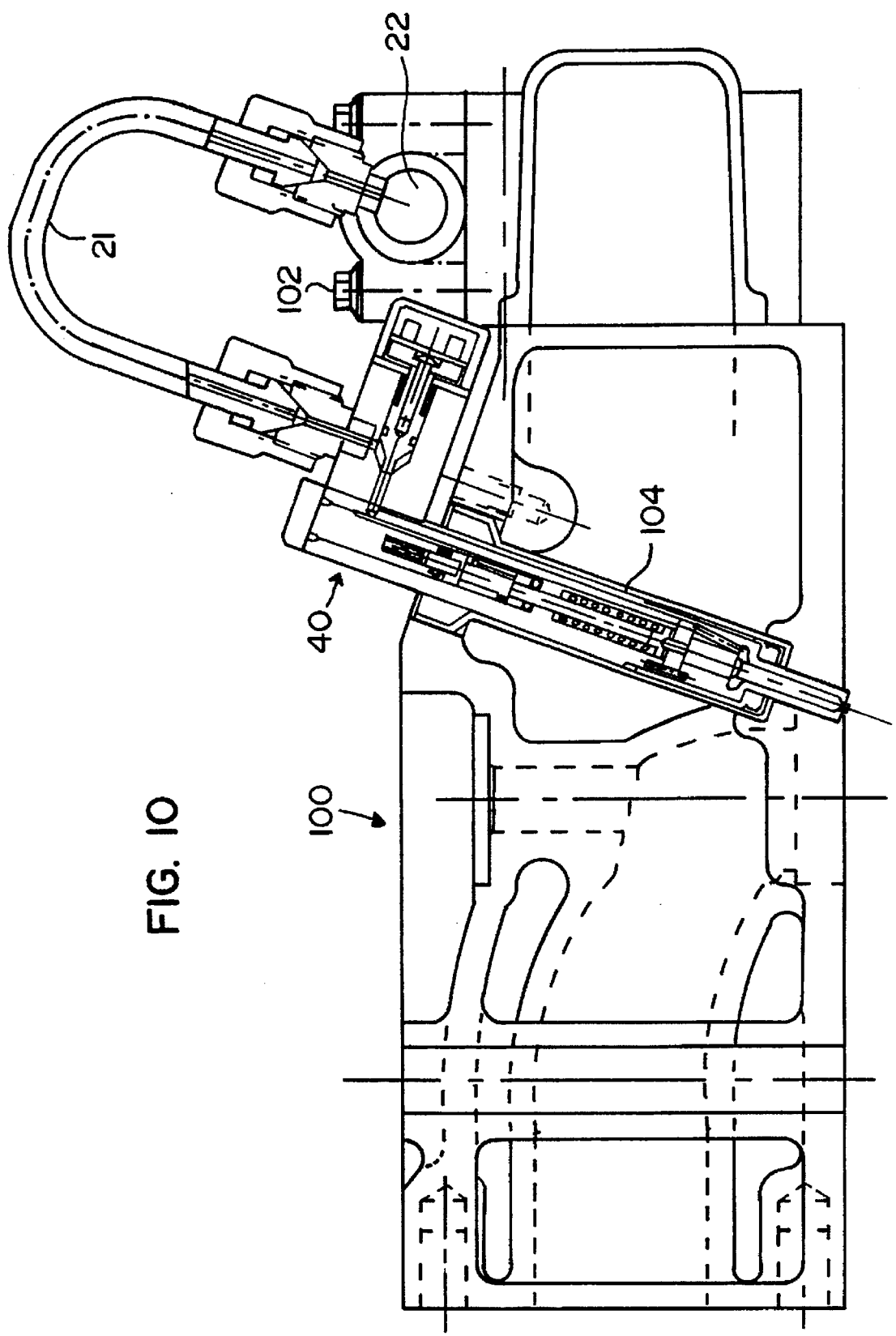
FIG. 10 is cross sectional view of a unit injector, of the type disclosed in FIG. 2, mounted in the injector cavity of a conventional engine.

FIG. 10 shows a cross section of a conventional cylinder head 100 that has a common rail 22, of the type previously described, secured thereto by bolts 102. An injector 40 incorporating the invention of this patent is mounted in the conventional injector aperture 104. A fuel passage line 21 is shown extending from the common rail to the injector 40. The injector portion of this invention has been built into a standard size injector body that can be inserted into the standard size injector aperture that is found in many existing diesel engines. In addition this Figure shows that the injector of this invention could be mounted in a conventional diesel engine that is fueled by conventional diesel fuel. When the injector of this invention is used in an engine fueled by diesel fuel, the concept of damping the initial portion of the injection cycle will reduce the $NO_x$ and the noise pollution.

While the invention has heretofore been described in detail with particular reference to an illustrated apparatus, it is to be understood that variations, modifications and the use of equivalent mechanisms can be effected without departing from the scope of this invention. It is, therefore, intended that such changes and modifications are covered by the following claims.

What is claimed is:

1. A fuel injector for an internal combustion engine comprising:

an elongated cylindrical shaped nozzle holder including a fuel inlet passage that is controlled by a fuel inlet valve, said fuel inlet valve being controlled by a solenoid carried by said nozzle holder to initiate a fuel injection cycle;

a cylindrical pintle valve body secured to said nozzle body and having an inlet port associated with said inlet passage, an internal cavity communicating with said inlet port, and a single axially aligned discharge aperture, said valve body having an beveled surface disposed interiorly adjacent to and about said discharge aperture;

a stepped-diameter pintle valve member mounted for reciprocal movement in said valve body between a closed position and a lifted position, said valve member including a discharge end having a first beveled portion, a cylindrical portion adjacent said first beveled portion of a given diameter slightly smaller than said discharge aperture, and a second beveled portion adjacent said cylindrical portion, said discharge end extending into said discharge aperture when said valve is in a closed position wherein said second beveled portion of said valve member abuts said beveled surface of said valve body, said valve member discharge end and said discharge aperture defining a variable flow area orifice therebetween dependent on the degree of movement of said valve member from said closed position toward said lifted position, said valve member further having an upper portion including an end extending into a central bore of said nozzle holder, and a stepped diameter portion in said cavity such that when pressurized fuel enters said cavity, the pressurized fuel exerts a force on the stepped diameter portion of the valve member causing it to move toward said nozzle holder to open said orifice;

a damping device in said nozzle holder central bore and operatively associated with said valve member end to throttle the flow area of said orifice during the initial portion of the fluid injection cycle by limiting movement of said valve member.

2. The invention in accordance with claim 1 and said damping device comprising a damping piston slidingly disposed in a damping portion of said central bore which is sealed from fuel containing portions thereof, said damping piston being operated through a push rod by said valve end., a seal being disposed between said bore and said push rod, and a non-fuel damping fluid disposed in said damping portion of said central bore.

* * * * *